(12) United States Patent
Fernandez de Grado et al.

(10) Patent No.: US 10,550,328 B2
(45) Date of Patent: Feb. 4, 2020

(54) DEVICE FOR THERMOLYSIS IN STAGES

(71) Applicant: HAFFNER ENERGY, Vitry le Francois (FR)

(72) Inventors: Alain Fernandez de Grado, Les Rivieres Henruel (FR); Philippe Haffner, Vitry le Francois (FR)

(73) Assignee: HAFFNER ENERGY, Vitry le Francois (FR)

( * ) Notice: Subject to any disclaimer, the term of this patent is extended or adjusted under 35 U.S.C. 154(b) by 99 days.

(21) Appl. No.: 15/770,884

(22) PCT Filed: Nov. 3, 2016

(86) PCT No.: PCT/FR2016/052851
§ 371 (c)(1),
(2) Date: Apr. 25, 2018

(87) PCT Pub. No.: WO2017/077243
PCT Pub. Date: May 11, 2017

(65) Prior Publication Data
US 2018/0312759 A1  Nov. 1, 2018

(30) Foreign Application Priority Data
Nov. 4, 2015 (FR) .................................. 15 60555

(51) Int. Cl.
*C10B 47/36* (2006.01)
*C10J 3/72* (2006.01)
*C10B 53/02* (2006.01)

(52) U.S. Cl.
CPC .............. *C10B 47/36* (2013.01); *C10B 53/02* (2013.01); *C10J 3/723* (2013.01)

(58) Field of Classification Search
CPC combination set(s) only.
See application file for complete search history.

(56) References Cited

U.S. PATENT DOCUMENTS 3,779,893 A  * 12/1973  Leas ..................... C10G 1/083
                                                                208/424
4,137,051 A    1/1979  Godwin
(Continued)

FOREIGN PATENT DOCUMENTS

EP          2 012 059 A1    1/2009
WO       2006/128285 A1   12/2006

OTHER PUBLICATIONS

International Search Report and Written Opinion of the International Search Authority dated Feb. 13, 2017 of corresponding International application No. PCT/FR2016/052851; 11 pgs.

*Primary Examiner* — Kaity V Chandler
(74) *Attorney, Agent, or Firm* — Maier & Maier, PLLC

(57) ABSTRACT

A thermolysis device for supplying heat energy at a temperature of between 80° C. and 700° C. and capable of adjusting the temperature inside a chamber including a raw material supply inlet, a thermolysis gas outlet, and an outlet for the solid or liquid materials from the thermolysis reaction. The chamber encloses at least one plate, separating the chamber into a top portion and a bottom portion, and at least one transfer element. The transfer element and/or the plate is mounted so as to rotate about an axis, the raw material supply inlet is placed above the plate, thus defining a first point for a raw material to drop onto the plate.

12 Claims, 4 Drawing Sheets

(56) References Cited

U.S. PATENT DOCUMENTS

| | | | | |
|---|---|---|---|---|
| 4,311,671 A | * | 1/1982 | Notman | B01J 8/0005 |
| | | | | 422/148 |
| 4,344,479 A | * | 8/1982 | Bailey | F22B 7/00 |
| | | | | 165/109.1 |
| 4,433,978 A | * | 2/1984 | Schenone | B01J 8/001 |
| | | | | 110/167 |
| 6,648,932 B1 | * | 11/2003 | Maton | C10B 47/22 |
| | | | | 48/119 |
| 2004/0182294 A1 | * | 9/2004 | Hahn | C10B 49/06 |
| | | | | 110/347 |
| 2008/0128259 A1 | * | 6/2008 | Kostek | B01D 5/0006 |
| | | | | 201/4 |
| 2011/0173885 A1 | * | 7/2011 | Davey | C10J 3/00 |
| | | | | 48/61 |
| 2011/0308287 A1 | * | 12/2011 | Vil'Chek | B09B 3/00 |
| | | | | 71/21 |
| 2015/0052813 A1 | * | 2/2015 | Neves | C10J 3/26 |
| | | | | 48/198.1 |
| 2016/0045841 A1 | * | 2/2016 | Kaplan | B01J 19/0093 |
| | | | | 429/49 |
| 2016/0237355 A1 | * | 8/2016 | Bynum | C10G 2/34 |

* cited by examiner

DEVICE FOR THERMOLYSIS IN STAGES

FIELD OF THE INVENTION

The present invention relates to energy production by gasification of solid or liquid organic material, this material can be derived from biomass, organic waste or fossil resources.

The invention relates especially to a thermolysis device and a syngas production process from organic matter using said device.

BACKGROUND

Gasification of organic matter is one possible way of recovering the energy therein, the other ways being combustion and ion methanisation.

The organic material is always constituted primarily of molecules composed of carbon C, hydrogen H and oxygen O, optionally combined with $H_2O$ water. If the organic material is subjected to a temperature of over 150° C. in an oxygen-deficient atmosphere, it then undergoes a transformation called pyrolysis, which breaks up the carbon molecules by breaking the covalent bonds. Products obtained during said pyrolysis are solids (mineral ash plus residual carbon called Char), vapours which condense at ambient temperature and pressure (tars, oils) and synthetic gas, called syngas, which remain in the gaseous state at ambient temperature and pressure (carbon monoxide, dihydrogen and gaseous elements that are of little economic value, such as carbon dioxide).

The char produced by pyrolysis also undergoes gasification by combination of carbon with oxygen, said oxygen partially coming from the molecules of the original organic material, and hydrogen which produces carbon monoxide, and dihydrogen methane in ideal conditions. This reaction is endothermic and requires a specific thermal input. Traditionally this contribution is provided by an air combustion reaction carried out in the method.

According to the current state of the art of organic matter gasification, syngas production uses two main technologies:
  In a cocurrent or counter-current fixed bed process, with a so-called slow pyrolysis, the raw material is introduced into a chamber in which it undergoes the steps of pyrolysis and gasification during its displacement. Air is introduced locally in the chamber in order to enable partial combustion of the char and to generate the energy required for endothermic gasification. The gases produced are extracted from either the side of the entrance of the raw material (counter-current logic) or the side of the ash outlet (co-current logic).
  In a fluidized bed of process with so-called fast pyrolysis, the raw material is first finely ground and then introduced into a reactor where a mass of hot particles, for example sand dolomite, is stirred. The raw material powder then almost instantly undergoes stages of pyrolysis and gasification. The gases produced were collected in a single main outlet placed in the upper position. The next step separates the gases produced with sand. It is then recirculated to the reactor to be recycled in the case of circulating fluidized beds.

These traditional solutions in particular have the following defects:
  In the case of the fluidized bed, the raw material must be carefully calibrated to be distributed quickly in the sand bed. To this end, a complex crushing apparatus and calibration of the incoming material is required. The sand bed is kept in a state of turbulence, which implies sand with perfect fluidity, and any ash melting primer within the sand bed strongly compromises the efficiency of the process. For these reasons, fluidized bed processes are operated at temperatures generally below 900° C., and the presence of alkali such as potassium must be very limited. Therefore, a temperature of 900° C. implies the residual presence of polycyclic aromatic hydrocarbons (tars) and does not ensure the complete gasification of the char.
  In the case of the fixed bed, the raw material descends by gravity while the gas must flow therein. It is necessary to avoid introducing particles that are too thin or small, typically less than 1 mm in diameter, as this could block the homogeneous flow of gas in the bed. The raw material is screened in order to reject fines before the introduction thereof into the pyrolysis reactor. Whatever the precautions taken, preferential currents are unavoidable with a bed collapse risk. For these reasons, co-current fixed beds are limited to low-power (less than 2 MW) and counter-current fixed beds do not enable use of the syngas in engines or turbines due to insufficient gas quality.
  In both cases the reaction that occurs first is pyrolysis because the energy required for processing the raw material is supplied by combustion carried out in the same device so that heat is immediately available. The absence of such an arrangement is that the combustion generates the occurrence of undesirable elements such as nitrogen oxides which are then mixed with the syngas to the detriment of the quality thereof. Moreover, it is not possible to recover the thermal energy of the gas as it leaves the equipment to supply the gasification process, which leads to a yield loss that generally exceeds 10%.
  Previous solutions, which are currently seldom used, implement a raw material mixed in a fixed or rotating drum to ensure consistency and advancement of the products from an inlet to an outlet. Some mixing accessories are present in the device, but the failure of these solutions is that no specific mechanical action is planned during processing to facilitate the release of vapours during pyrolysis. In addition, the operating temperatures are generally below 600° C., not allowing the production of syngas of sufficiently high-quality for use in an engine or a turbine.

SUMMARY

The present invention aims to overcome the disadvantages of the prior art by providing a pyrolysis device capable of producing char and syngas that is much better than that obtained with pyrolysis, and at the same time using less-costly technology than traditional solutions.

Thus, the present invention relates to an organic material pyrolysis device comprising a means of providing thermal energy, at a temperature between 80° C. and 700° C., capable of regulating the temperature inside a chamber having a raw material supply, a pyrolysis gas outlet and an outlet for solid or liquid products of the reaction from the thermolysis, said chamber enclosing at least one tray separating said chamber into an upper portion and a lower portion and at least one transfer member, remarkable in that said transfer member and/or tray is mounted for rotation about an axis, said raw material supply is disposed above said tray, defining a first point where raw material drops on the latter, said tray has a drain hole communicating between said upper portion and said lower portion and positioned angularly after the raw material drop point in the direction of relative rotation and in that said transfer member extends radially from the center of said tray in the direction of the wall of said chamber above said tray and in that said device further comprises at least one presser member extending above said tray, between the center of said tray and the wall of said chamber, and in that said presser member defines an air gap decreasing from the front to back of said air gap.

In the context of the invention, the terms "front" and "rear" are defined relative to the direction of relative rotation of said air gap.

According to a preferred embodiment of the invention, said device further comprises an inner shaft substantially perpendicular to said tray the longitudinal axis of which passes through the center of said tray and associated with at least one transfer member and/or at least a presser member, said inner shaft is rotatably mounted about the longitudinal axis thereof, and said transfer member and/or the tensioning device extend from the inner shaft towards the wall of said chamber above said tray.

According to a preferred embodiment of the invention, said air gap has a maximum size of 30 cm and a minimum size of 1 mm.

According to a preferred embodiment of the invention, the presser member includes a mechanical exhaust means.

According to a preferred embodiment of the invention, said mechanical exhaust means comprises at least one elastic means exerting a return force on said presser member.

According to a preferred embodiment of the invention, said elastic means is an adjustable stroke spring.

According to a preferred embodiment of the invention, said mechanical exhaust means is a translation system with a slidable presser member.

According to a preferred embodiment of the invention, said translation system comprises a means for adjusting the mass of the slidable presser member.

According to a preferred embodiment of the invention, the minimum distance between the lower edge of the transfer member and the tray is between 2 and 400 mm.

According to a preferred embodiment of the invention, said tray has a rough surface of a roughness Ra greater than 2 mm.

According to a preferred embodiment of the invention, said device comprises a plurality of superimposed trays and in that each tray drain hole is offset angularly in the direction of relative rotation with respect to the tray drain hole disposed directly above same.

According to a preferred embodiment of the invention, said thermal energy supply means is arranged on said tray and/or the wall of the chamber.

The present invention also relates to a method of thermolysis of organic material using a device according to one of the preceding claims.

The advantage of the invention is first that the raw material undergoes, in a chamber generally sealed to the outside atmosphere, gradual pyrolysis transformation associated with an erosion mechanism of the friable surface of the processed material.

The installed mechanism enables an effective and energy-efficient way of disengaging the friable rendered material on the surface, to reduce same to dust calibrated to promote the vaporization of gases and oils, transporting the char obtained to the point of exit thereof and collecting the different vaporised fluids towards the exit points thereof. This invention makes it possible to use coarse size raw material having a broad particle size distribution, more than 90% of the mass is composed of members having a maximum size of between 50 cm and 1 mm.

BRIEF DESCRIPTION OF THE FIGURES

Other features and advantages of the invention will become apparent from the following detailed description of non-limiting embodiments of the invention, with reference to the accompanying drawings, in which.

DETAILED DESCRIPTION OF THE FIGURES

By convention we will use the word thermolysis to refer to all stages of separation of volatile elements with carbon chains (including water) and reducing the length of the carbon chains to obtain pure carbon, called char, and ash on one side and different reaction gases including volatile compounds, dihydrogen, methane and carbon monoxide on the other side.

The invention relates to the step of pyrolysis which is characterized by a separation of components of the organic material treated under the effect of an elevated temperature between 80° C. and 700° C., and deficient in an oxidizing agent such oxygen. Deficient means that the amount of oxidant available is much less than the amount required to allow full oxidation reaction that is to say a total stoichiometric combustion.

Figure 1:
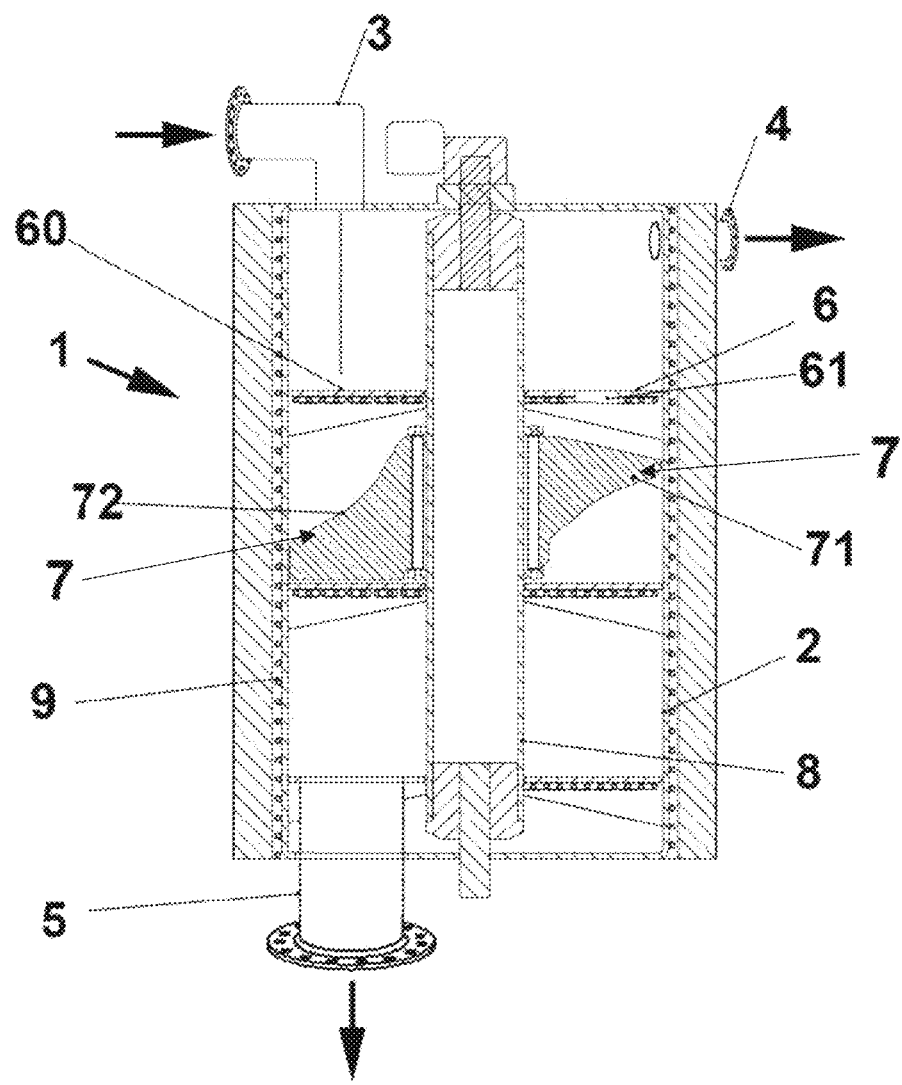
FIG. 1 schematically shows the thermolysis device 1 of the invention and its general operating principle.

As shown in FIG. 1, the present invention relates to a device 1 for thermolysis of organic material consisting of a chamber 2, preferably fixed, cylindrical in shape and arranged along a vertical axis or inclined at most at an angle of 45° relative to the vertical.

A central shaft 8 which rotates about the longitudinal axis thereof is placed within the chamber, guided by any conventional mechanical means such as bearings, for connection with the housing 2. The guiding in rotation of the shaft 8 is designed in a sealed manner relative to the housing 2 to prevent the outside air from entering the chamber in this way, thus jeopardizing the desired lack of oxidant.

A raw material supply feed 3 is installed at the top of the chamber. Said supply feed is designed sealingly so as to prevent outside air from entering the chamber in this way, thus jeopardizing the desired lack of oxidant. Any traditional solution for an air-tight supply of material is suitable. For example, a sluice system with two sealing valves controlled alternatively enabling regular delivery of a quantity of material defined by the volume of the chamber to the chamber connected to the sluice. Another example is obtained with the use of a hopper and a rotating lock. At each rotation of the lock, a dose is delivered to the chamber.

An outlet 5 of the solid products resulting from the processing of the raw material is installed at the bottom of the chamber. The airtightness of this connection can be achieved by the use of a two valves sluice or a discharge screw or any equivalent solution.

An outlet 4 of the vaporized products (gas and oil) is installed between the inlet 3 and the outlet 5, preferably attached to the outer chamber 2. A variant can be obtained by allowing the output of gas through a hole drilled in the center the shaft of the rotary mechanism 3. The airtightness of such a fixed connection can be secured by the use of sealed flanges.

The outlet 4 is advantageously connected to a gas extraction means, for example a suction fan placed further along the gas circuit. The relative vacuum created by the draft fan ensures that any leaks in the chamber and the connections thereto will not result in a gas leak to the outside, but by a leakage of outside air inward. This is a security measure, as it is less dangerous to enter air into the chamber than to let the gas into the atmosphere. However, this air brings oxygen with it which disrupts the thermolysis. It is therefore essential to guarantee the sealing of the connections of the apparatus.

A tray 6 perpendicular to the axis of the chamber is placed inside thereof. This tray receives by gravity the raw material to be processed, inserted through the inlet 3, which defines a base 60 of the tray 6. The material is then rotated on the tray by the action of transfer members 7 on the shaft 8. These transfer members have the function of transferring the material from its drop point 60 to a drain hole 61 formed in the tray. Preferably, the relative angular position between the drop point and the drain hole is close to 360°, but slightly smaller so as to prevent the material falling onto the drop point of the tray from overflowing and falling directly into the drain hole without going around the tray. The reason for going around on this tray is to keep the material for several seconds to several minutes in an oxygen-deprived atmosphere allowing thermolysis.

Figure 2:
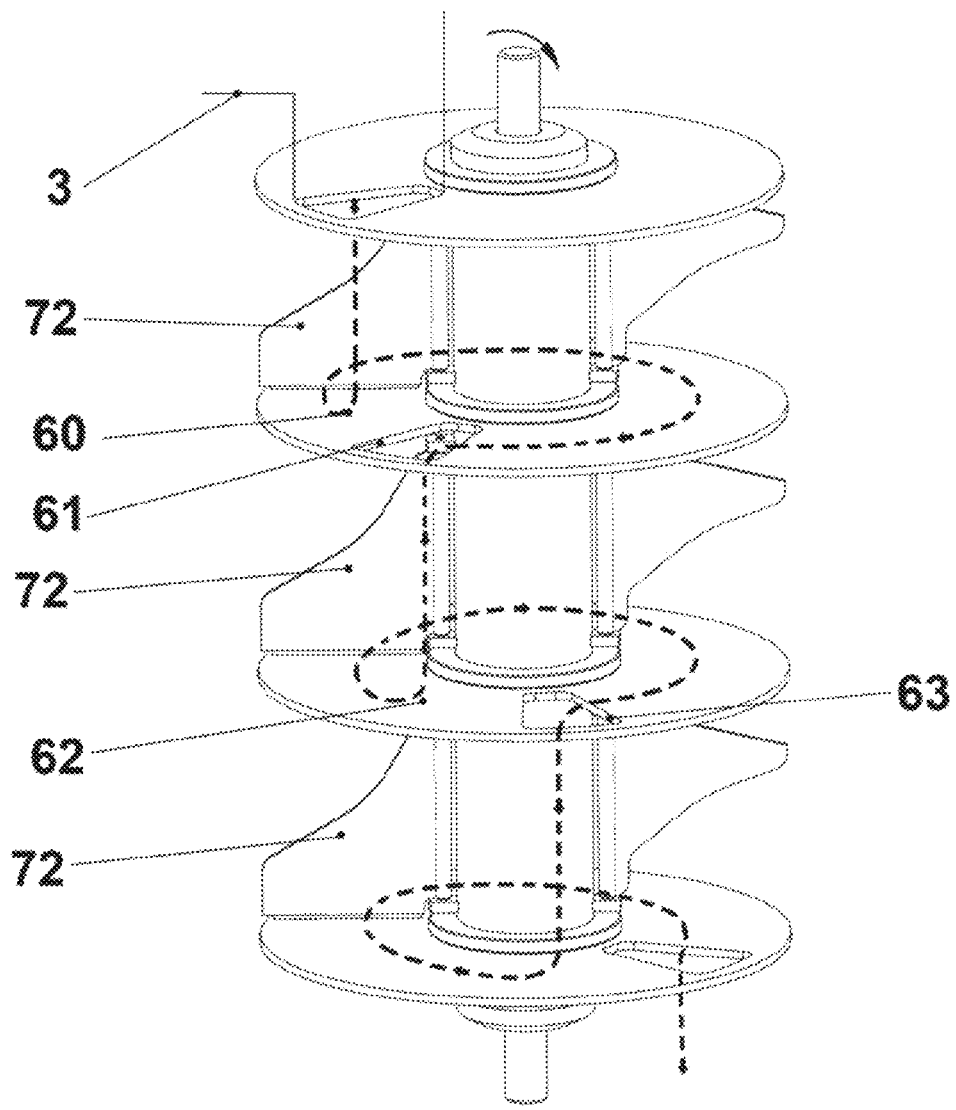
FIG. 2 schematically shows the general principle of the mass transfer in operation.

According to a variant of the invention, the use of several superimposed trays is advantageous. As shown in FIG. 2, a first tray is placed in the upper position in the chamber, a second tray is placed under the first, e.g., at a vertical distance thereof of between 30 cm and 120 cm. The material is fed through the inlet 3, falls on the upper tray at a drop point 60, is rotated by the transfer members 72, leaving the first tray through the drain hole 61 and falling onto the second tray on a new drop point 62. The material is then rotated by the transfer members 72 placed in the second stage to the new drain hole 63 which then drops the material to a next stage or to the exit point 5 of the chamber.

The transfer members 7 are advantageously in the form of straight paddles or ploughshares attached to the shaft 8.

According to a variant of the invention, there are two types of paddles: the upper paddle 71 is in the upper layer of the material placed on the tray 6, and the lower paddle 72 acts on the lower layer, closer to the surface of the tray. The combination of two kinds of paddles is used to continuously turn the bed of material during thermolysis, to make the material placed against the tray go up again and vice versa to make the material placed above the bed of material go down again.

Means for heating 9 the chamber supplies thermal energy through a heat transfer fluid heated by any means annex to the device of the invention. For example, the chamber may be surrounded by a heat pipe system in which circulates a mineral oil or a molten salt at very high temperatures. Around this layer of pipe, heat insulating wrapping limits heat leakage to the outside of the chamber.

The tray may also be equipped with a heat transfer pipe network, typically on the underside to allow the free upper side to receive the raw material during thermolysis.

According to a variant of the invention, the heating means 9 may comprise an electrical heating network by Joule effect, which also surrounds the chamber and/or which is positioned on or in the thickness of the tray.

According to another variant of the invention, the heating means can be integrated with the inner shaft 8 so as to heat the chamber from the surface of the shaft 8, the transfer members 7 and/or the presser members 73.

According to a variant of the invention, the chamber 2 may be rotating and the inner shaft 8 fixed to the floor, allowing a relative rotational movement. In this embodiment, the connections of the chamber with the input and output products are obviously more complex to achieve.

According to the invention, the shaft 8 also carries the presser members 73 whose function is to accelerate the thermolysis reaction of the raw material by exerting crushing forces on the particles during thermolysis.

The advantage of this action on the top friable layer of thermolysed particles is that the bottom layer is thus released from its upper gangue and can freely receive the flow of heat that prevails in the chamber and thus release gases and vapours faster during the pyrolysis reaction. The pyrolysis reaction is faster than in the absence of pressers.

These members rotate relative to the tray 6 and comprise a lower tray 76 inclined with respect to the upper face of the tray. This inclination defines a decreasing air gap between the presser member and the tray, the maximum air gap 74 is placed in front of the tensioning device according to the advancing direction during the rotation, and the minimum air gap 75 to the back. Thus, during movement of these members, the raw material particles during thermolysis penetrate the bottom tray 76 in this air gap and are crushed during the rotation.

According to an advantageous variant, the upper face of the tray has a significant roughness, for example with a roughness Ra of more than 2 mm, so that the material rotated by the presser members 73 is broken and penetrates the air gap.

Figure 3:
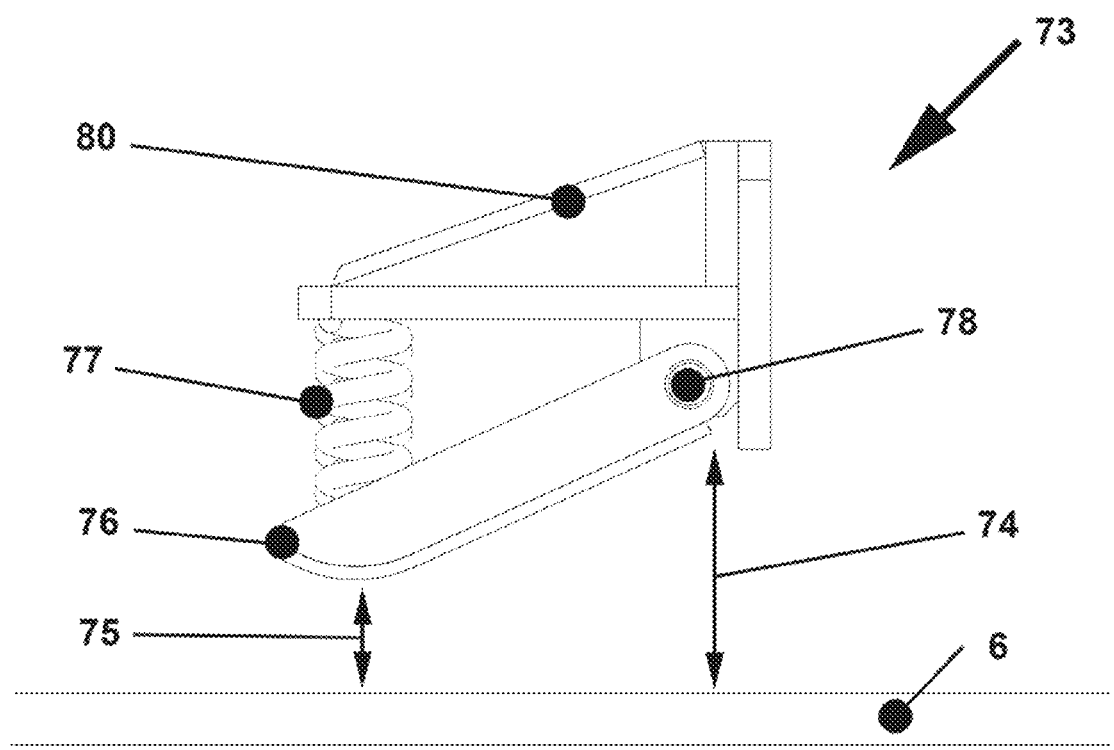
FIG. 3 schematically shows an example of a presser member with a pivot and spring used in a variant of the invention FIG. 4 schematically shows an example of a presser member with a slide and spring used in a variant of the invention.

According to a variant of the invention, as shown in FIG. 3, the presser member has a pivot connection 78 between the bracket 80 fixed to the shaft 8 and the lower tray 76. In addition one or more springs 77 are interposed between the bracket 80 and the lower tray 76. This freedom of rotational movement allows the lifting of the bottom tray if a raw material particle does not break into a smaller element in the minimum air gap 75. In this case the particle has a lifting force on the bottom tray which retracts by pivoting around the axis 78 thereof. In order to facilitate the return of the bottom tray 76, after the rejected particle escapes, it is advantageous to combine same with a spring adapted to lower the lower tray into the low position.

Figure 4:
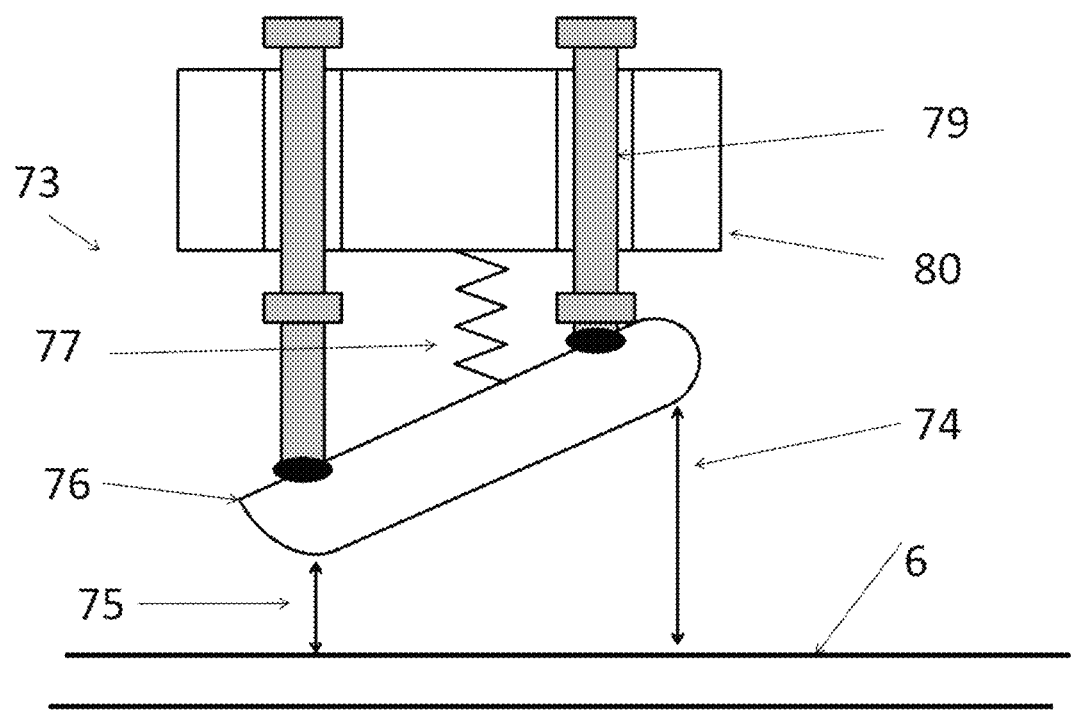

According to another variant of the invention, as shown in FIG. 4, the presser member has a sliding connection 79 between the bracket 80 fixed to the shaft 8 and the lower tray 76. Moreover, advantageously one or more springs 77 are interposed between the bracket 80 and the lower tray 76. This freedom of translational movement allows the lifting of the bottom tray if a feedstock particle does not break into elements of sizes smaller than the minimum air gap 75. In this case, the particle exerts a lifting force on the bottom tray which retracts by sliding in the slide 79. After the rejected particle is ejected, the spring pushes the bottom tray into a normal position. The absence of a spring can be compensated for by adjusting the mass of the movable lower tray beyond 1 kg so as to provide a pressing force of at least 10 N.

According to a variant of the invention, the springs have an adjustable stroke so as to adjust the maximum retraction force of the bottom tray, applying the law of stiffness of a spring.

According to a variant of the invention, the spring may be a torsion spring, not a translation spring, the action of which on the tray is particularly suitable in the case of the pivot connection.

According to an advantageous embodiment, the transfer member 7 and the presser member 73 can be combined on the same support member extending from the shaft 8 towards the inner surface of the chamber 2.

The invention also relates to a thermolysis process using the means and configurations described hereinbefore.

The invention claimed is:

1. A device for thermolysis comprising:
a thermal energy input capable of regulating and maintaining an inside of a chamber at a temperature between 80° C. and 700° C.; wherein the device comprises a supply of raw material, an outlet of thermolysis gas and an outlet of solid or liquid products of the thermolysis reaction, said chamber comprising an upper wall, a lower wall, and a side wall enclosing at least one tray separating said chamber into an upper portion and a lower portion and at least one transfer member, wherein said transfer member and/or the tray is rotatably mounted around an inner shaft, said raw material supply is placed over said tray, defining a first drop point of raw material thereon, said tray having a drain hole communicating between said upper portion and said bottom portion and arranged angularly after the first drop point of the raw material in the direction of relative rotation, and said transfer member extends radially from the center of said tray to the side wall of said chamber above said tray, and said device includes at least one presser member extending above said tray between the center of said tray and the side wall of said chamber, and wherein said presser member defines an air gap decreasing from the front, near the shaft, to the rear of said air gap, near the side wall.

2. The device for thermolysis according to claim 1, wherein the inner shaft is substantially perpendicular to said tray and the longitudinal axis of which passes through the center of said tray and is associated with the at least one transfer member and/or the at least one presser member, said inner shaft is rotatably mounted about the longitudinal axis thereof, and said transfer member and/or the presser member extend from the inner shaft towards the side wall of said chamber above said tray.

3. The device according to claim 1, wherein said air gap has a maximum value of 30 cm and a minimum value of 1 mm.

4. The device according to claim 1, wherein the presser member includes a mechanical exhaust.

5. The device according to claim 4, wherein said mechanical exhaust includes at least one elastic means exerting a return force on said presser member.

6. The device according to claim 5, wherein said elastic means is an adjustable stroke spring.

7. The device according to claim 4, wherein the presser member is a slidable presser member, and wherein said mechanical exhaust is a translation system of the slidable presser member.

8. The device according to claim 7, wherein said translation system adjusts the mass of the slidable presser member.

9. The device according to claim 1, wherein the minimum distance between a lower edge of the transfer member and the tray is between 2 and 400 mm.

10. The device according to claim 1, wherein said tray has a surface roughness Ra greater than 2 mm.

11. The device according to claim 1, further comprising a plurality of superposed trays, wherein the drain hole of each tray is offset angularly in the direction of relative rotation with respect to the drain hole of the tray arranged directly above it.

12. The device according to claim 1, wherein said thermal energy input is arranged in said tray and/or the wall of the chamber.

* * * * *